United States Patent
Morimoto et al.

(10) Patent No.: US 9,444,952 B2
(45) Date of Patent: Sep. 13, 2016

(54) IMAGE READING DEVICE

(71) Applicant: Mitsubishi Electric Corporation, Chiyoda-ku (JP)

(72) Inventors: Takuo Morimoto, Chiyoda-ku (JP); Tomokazu Ogomi, Chiyoda-ku (JP); Toshiaki Shoji, Chiyoda-ku (JP); Masashi Hino, Chiyoda-ku (JP); Toru Aramaki, Chiyoda-ku (JP); Atsushi Ito, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/440,543

(22) PCT Filed: Apr. 3, 2014

(86) PCT No.: PCT/JP2014/059857
§ 371 (c)(1),
(2) Date: May 4, 2015

(87) PCT Pub. No.: WO2014/163148
PCT Pub. Date: Oct. 9, 2014

(65) Prior Publication Data
US 2015/0304511 A1    Oct. 22, 2015

(30) Foreign Application Priority Data
Apr. 5, 2013 (JP) ................. 2013-079745

(51) Int. Cl.
| | |
|---|---|
| G07D 7/04 | (2016.01) |
| H04N 1/00 | (2006.01) |
| G07D 7/12 | (2016.01) |
| H04N 1/12 | (2006.01) |
| H04N 1/193 | (2006.01) |

(52) U.S. Cl.
CPC ............ *H04N 1/00326* (2013.01); *G07D 7/04* (2013.01); *G07D 7/12* (2013.01); *H04N 1/00339* (2013.01); *H04N 1/12* (2013.01); *H04N 1/193* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 4,574,190 | A | * | 3/1986 | Nishimura .................... 235/449 |
| 5,739,517 | A | | 4/1998 | Hoshino et al. |
| 2006/0279280 | A1 | | 12/2006 | Minamitani et al. |
| 2007/0000750 | A1 | * | 1/2007 | Uno et al. .................... 194/207 |

FOREIGN PATENT DOCUMENTS

| | | |
|---|---|---|
| JP | 7-93843 A | 4/1995 |
| JP | 8-22652 A | 1/1996 |
| JP | 8-279016 A | 10/1996 |
| JP | 2012-84059 A | 4/2012 |
| JP | 2012-143003 A | 7/2012 |
| WO | 2005/083457 A1 | 9/2005 |

OTHER PUBLICATIONS

International Search Report Issued May 13, 2014 in PCT/JP14/059857 Filed Apr. 3, 2014.
Written Opinion issued May 13, 2014 in PCT/JP2014/059857, filed Apr. 3, 2014, including computer-generated English translation of Written Opinion and English version of Jul. 2011 PCT/ISA/237 form (9 pages).

* cited by examiner

*Primary Examiner* — Stephen R Koziol
*Assistant Examiner* — Raphael Schwartz
(74) *Attorney, Agent, or Firm* — Oblon, McClelland, Maier & Neustadt, L.L.P.

(57) ABSTRACT

A magnet is disposed on one side of a conveyance plane in which a sheet-like medium to be read is conveyed and generates a magnetic field in a direction perpendicular to the conveyance plane. A magnetoresistive effect element is disposed between the magnet and the conveyance plane, and detects an intensity variation in a conveyance direction component of the magnetic field in a magnetic reading area. An imaging optical system and a light receiver are disposed on the side opposite to the magnet side with respect to the conveyance plane. The imaging optical system forms an image of an optical reading area on the light receiver, the optical reading area including at least a portion in the conveyance direction of the magnetic reading area of the conveyance plane.

16 Claims, 9 Drawing Sheets

IMAGE READING DEVICE

TECHNICAL FIELD

The present disclosure relates to image reading including magnetic reading. More particularly, the present disclosure relates to an image reading device that detects image information and magnetic pattern information (magnetic information) of a sheet-like medium to be read.

BACKGROUND ART

A device for handling sheet-like media to be read, for example, paper money, checks, or securities such as store credit vouchers, which has been conventionally known as, for example, an automated transaction machine, a passbook printer, a ticket issuing machine, and the like, is provided with an image reading sensor, a magnetic reading sensor, and the like, and obtains various information such as an optical image and a magnetic pattern of a printed pattern on the medium to be read. For example, a paper sheets handling device of Patent Literature 1 includes an optical sensor and a magnetic sensor as a first type of sensors. The image reading sensor and the magnetic reading sensor are disposed individually in an automated transaction machine, and information read by each sensor is handled as information in which positional information are not related mutually.

Patent Literature 2, for example, describes an image reading device not including both of an optical sensor and a magnetic sensor but including multiple independent imaging optical systems that are each arranged in a main scanning direction. Multiple cells in the optical systems are provided so that each cell of each row is arranged in alternate manner in the main scanning direction so as to allow the formed images to be complementary between the cells of the image reading device of Patent literature 2. Then, information of the image taken by each cell is combined to create a document image.

CITATION LIST

Patent Literature

Patent Literature 1: Unexamined Japanese Patent Application Kokai Publication No. 2012-84059
Patent Literature 2: Unexamined Japanese Patent Application Kokai Publication No. 2012-143003

SUMMARY OF INVENTION

Technical Problem

The paper sheets handling device according to Patent Literature 1 is provided with the image reading device and the magnetic reading device, but arranging the devices individually results in different positions and areas for reading, the obtained information cannot be processed as the information of the same object. Furthermore, the optical image and the magnetic pattern that have no relation as images cannot be combined as with the combined image information in the image reading device of Patent Literature 2.

The present disclosure has been made in view of the above circumstances, and an objective of the present disclosure is to read the positional relationship between the optical image and the magnetic pattern as information.

Solution to Problem

In order to achieve the above objective, an image reading device according to the present disclosure includes a magnetic circuit, a magnetoresistive effect element, a light source, an imaging optical system, and a light receiver. The magnetic circuit is disposed on one side of a conveyance plane in which a sheet-like medium to be read is conveyed along a direction of a sheet surface of the medium to be read, and generates a magnetic field in a direction perpendicular to the conveyance plane. The magnetoresistive effect element is disposed between the magnetic circuit and the conveyance plane, and detects an intensity variation in a conveyance direction component of the magnetic field in a magnetic reading area when the medium to be read is conveyed along the conveyance plane. The light source is disposed on the side opposite to the magnetic circuit side with respect to the conveyance plane, and irradiates the magnetic reading area of the conveyance plane with light. The imaging optical system and the light receiver are disposed on the side opposite to the magnetic circuit side with respect to the conveyance plane. The imaging optical system images an optical reading area, which includes at least a portion in the conveyance direction of the magnetic reading area in the conveyance plane, on the light receiver.

Advantageous Effects of Invention

According to the present disclosure, the reading areas at the respective positions for the optical image reading and the magnetic reading have overlapped areas. Therefore, the information on the optical image and the magnetic pattern is obtained simultaneously, and the positional relationship between the optical image and the magnetic pattern can also be read as information. This results in improvement of identification accuracy of the medium to be read.

DESCRIPTION OF EMBODIMENTS

Embodiments of the present disclosure are described below with reference to the drawings. Throughout the drawings, the same or like parts are given the same signs.

Embodiment 1

Figure 1:
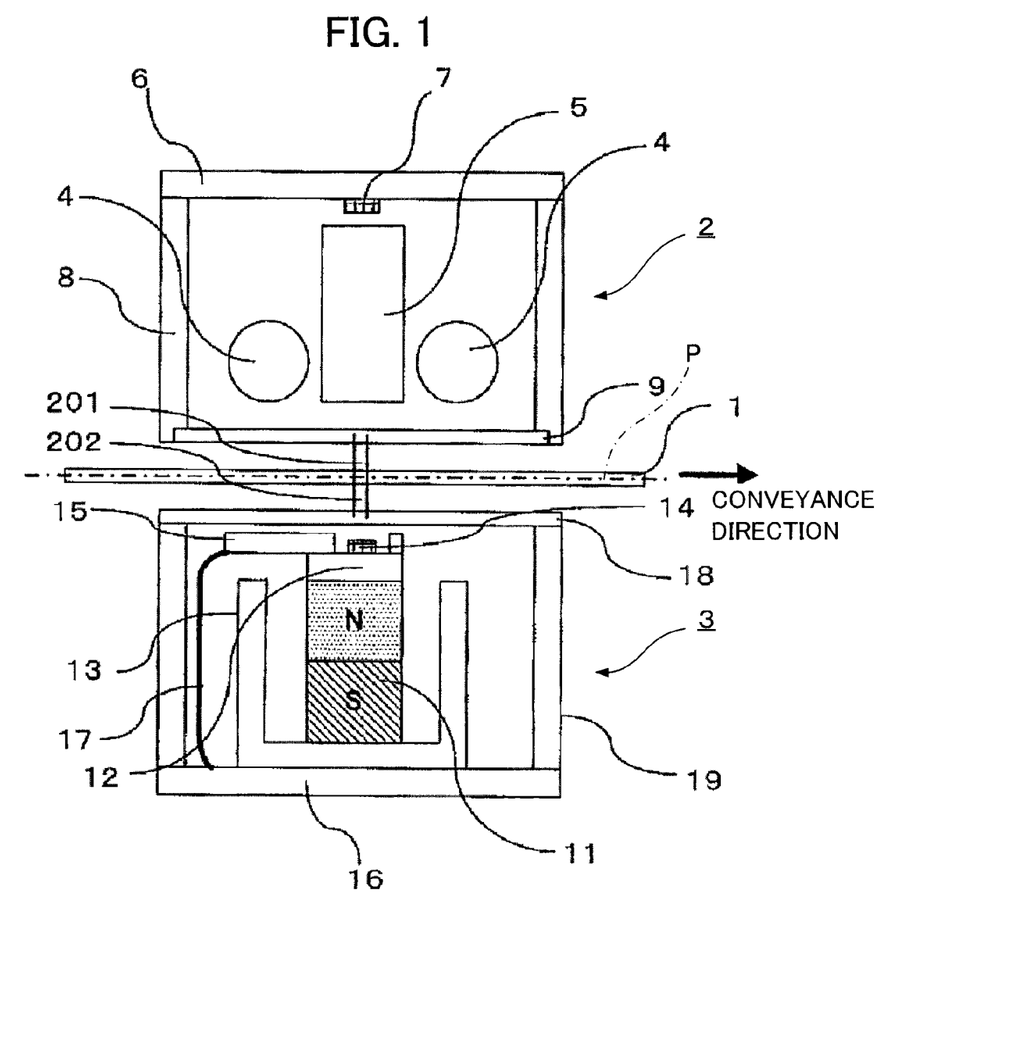
FIG. 1 is a cross sectional view orthogonal to a main scanning direction of an image reading device according to Embodiment 1 of the present disclosure.
Figure 2:
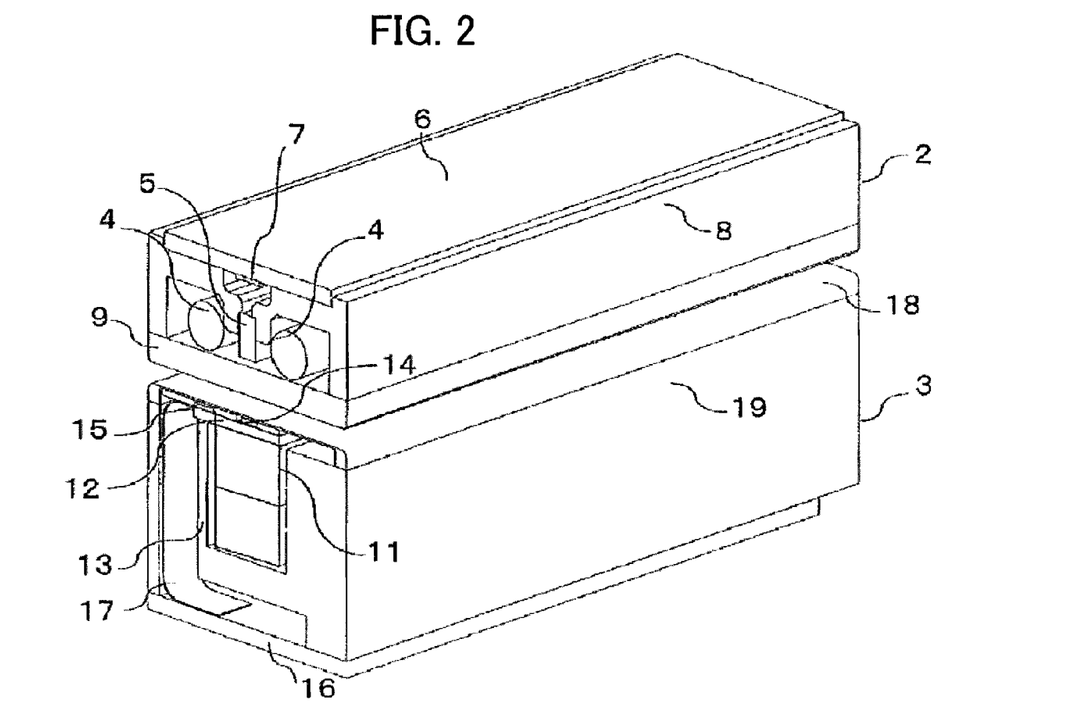
FIG. 2 is a perspective view of the image reading device according to Embodiment 1.

FIG. 1 is a cross sectional view orthogonal to a main scanning direction of an image reading device according to Embodiment 1 of the present disclosure. FIG. 2 is a perspective view of the image reading device according to Embodiment 1. The image reading device of the present embodiment reads an optical image as well as a magnetic pattern, but is herein referred to as an image reading device. However, this does not mean that the optical reading is primary and the magnetic reading is subordinate.

The image reading device according to Embodiment 1 of the present disclosure includes an optical reader 2 that is disposed on one side of a conveyance plane P (in FIG. 1, at the upper side thereof) in which sheet-like medium to be read containing a magnetic component, such as paper money, securities, checks, or the like is conveyed along a direction of a sheet surface thereof. A magnetic reader 3 is disposed on the other side of the conveyance plane P (in FIG. 1, at the lower side thereof).

Upon the medium to be read 1 passing between the optical reader 2 and the magnetic reader 3, the optical reader 2 obtains an optical image such as leading position information and pattern information of the medium to be read 1, and the magnetic reader 3 obtains a magnetic pattern by detecting a magnetic material contained in the medium to be read 1. Here, the magnetic material contained in the medium to be read 1 includes a material printed with magnetic ink. In other words, the magnetic material contained in the medium to be read 1 includes a material existing on the surface thereof. The plane in which the medium to be read 1 is conveyed is referred to as a conveyance plane P, and the direction in which the medium to be read 1 is conveyed (in FIG. 1, from the left side to the right side) is referred to as a conveyance direction or a sub-scanning direction. The direction parallel to the conveyance plane P and orthogonal to the conveyance direction (sub-scanning direction), that is, the direction perpendicular to the plane of the paper of FIG. 1, is referred to as a main scanning direction. The optical reader 2 obtains an optical image from the medium to be read 1 in the main scanning direction (the direction orthogonal to the conveyance direction (sub-scanning direction)). The magnetic reader 3 obtains a magnetic pattern from the medium to be read 1 in the main scanning direction (the direction orthogonal to the conveyance direction (sub-scanning direction)).

The optical reader 2 is configured to have a contact image sensor (hereinafter referred to as CIS), a camera, a reduction optical system, or the like. The configuration of the optical reader 2 is explained using the CIS as an example. A light guide 4, an imaging optical system 5, and a light receiver 7 are accommodated in a housing 8 of the optical reader 2, each of which is held in a predetermined position. The light guide 4 includes a light emitting element such as an LED at the end thereof in the main scanning direction, and is a light source to irradiate an optical reading area 201 of the conveyance plane P with light from a light exit portion on the side surface in the main scanning direction. The imaging optical system 5 focuses light emitted from the light guide 4 and reflected by the medium to be read 1, and forms an image on the light receiver 7. The light receiver 7 is mounted to a sensor substrate 6 and converts the image of the optical reading area 201 formed by the imaging optical system 5 into an electrical signal. The conveyance plane P side of the housing 8 is covered with a transmission body 9 formed of glass, an acrylic plate, or the like, and the transmission body 9 transmits the light emitted from the light guide 4 and the light reflected by the medium to be read 1 therethrough. The transmission body 9 protects the light guide 4, the imaging optical system 5, and the light receiver 7.

The magnetic reader 3 includes a magnet 11 with north and south poles arranged in a direction perpendicular to the conveyance plane P, a yoke 12, a yoke 13, a magnetoresistive effect element (MR element) 14, and a substrate 15 to which an output terminal of the MR element 14 is connected. The yoke 12 is disposed on an end surface of the magnet 11, facing the conveyance plane P, that is, at the conveyance plane P side of the magnet 11. The yoke 13 has a bottom portion being in contact with the end surface of the magnet 11 at the farthest side from the conveyance plane P, and extension portions extending from the bottom portion toward the conveyance plane P at both sides of the magnet 11 in the conveyance direction. The yoke 13 is U-shaped in cross section orthogonal to the main scanning direction. The yokes 12 and 13 are provided to improve the uniformity of magnetic field. Here, the magnet 11, the yoke 12, and the yoke 13 constitute a magnetic circuit. Of course, the magnet 11 alone may constitute a magnetic circuit. Furthermore, the configuration excluding the magnetic circuit from the magnetic reader 3 may be referred to as a magnetic reader 3, or the MR element 14 alone may be referred to as a magnetic reader 3.

The magnetoresistive effect element (MR element) 14 is mounted at the conveyance plane P side of the yoke 12, and detects the intensity variation in a conveyance direction component of the magnetic field in the magnetic reading area 202 of the conveyance plane P. The magnetoresistive effect element 14 detects magnetic information (magnetic pattern information) of the magnetic reading area 202 and outputs the magnetic information electrically as a change in a resistance value. The electrical signal output from the MR element 14 is transmitted via the substrate 15 through a signal line 17 to a signal processing board 16. The signal processing board 16 processes the electrical signal output from the MR element 14 and outputs the magnetic pattern information. The magnet 11, the yoke 12, the yoke 13, the MR element 14, the substrate 15, and the signal line 17 are accommodated in a housing 19, and are each held in a predetermined position. The signal processing board 16 is mounted to the opposite side of the housing 19 from the conveyance plane P. The conveyance plane P side of the housing 19 is covered with a non-magnetic top plate 18 to protect the MR element 14.

Figure 3:
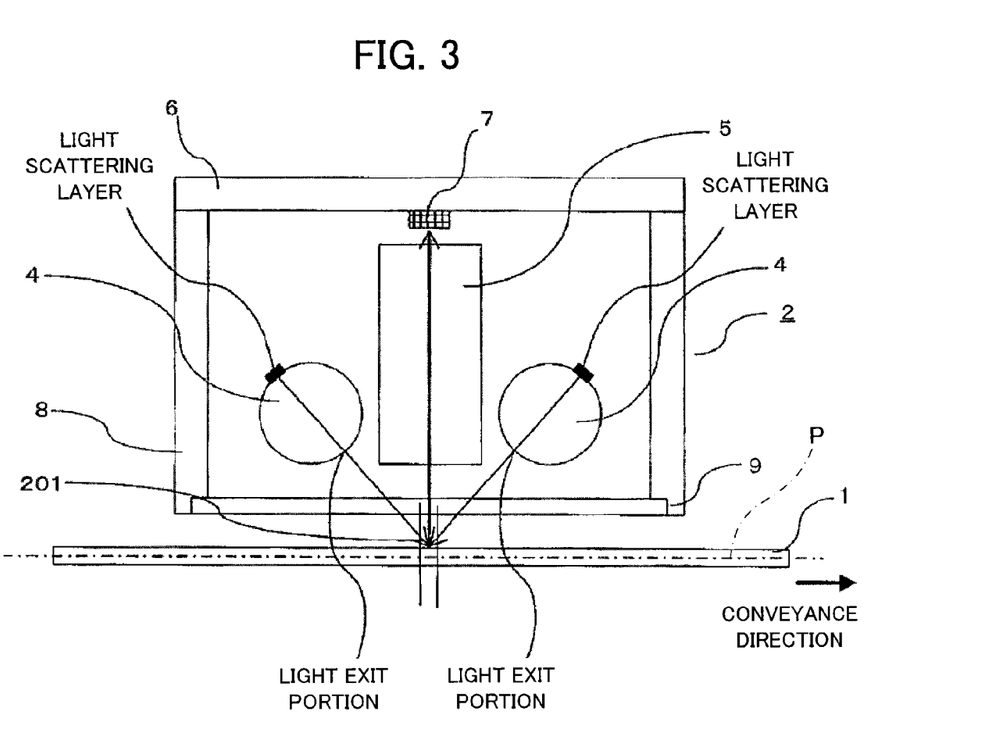
FIG. 3 is a cross sectional view orthogonal to the main scanning direction of an optical reader according to Embodiment 1.

FIG. 3 is a cross sectional view orthogonal to the main scanning direction of the optical reader according to Embodiment 1. FIG. 3 is also an enlarged view of the optical reader 2 of FIG. 1. Light generated from an LED (not shown) provided at an end in the main scanning direction of the light guide 4 enters the light guide 4, and propagates within the light guide 4 in the main scanning direction. The light guide 4 has a perfectly circular or substantially circular cross section, and a light scattering layer (light scattering area) for scattering or reflecting light is formed on the light guide 4 in the main scanning direction. The light scattering layer is configured in a white silk screen printed pattern or vapor deposition pattern on the surface of the light guide 4. As an alternative method to provide the light scattering layer, cutting grooves in the light guide 4 or surface roughening of the light guide 4 can be used. The light scattering layer is formed so that the pattern shapes or pitches thereof are adjusted appropriately to achieve uniform light emission along the main scanning direction.

Light passing through an internal light guide path of the light guide 4 is scattered on the light scattering layer and emitted toward the medium to be read 1 from an exit portion (light exit portion) that is a portion opposite to the light scattering layer around the central axis of the light propagating direction of the light guide 4. The light emitted from the light guide 4 illuminates the optical reading area 201 of the conveyance plane P (medium to be read 1).

The light that illuminates the optical reading area 201 is reflected on the medium to be read 1, enters as scattered light the imaging optical system 5 that is an optical system for forming an image, and is focused by the imaging optical system 5, and then the optical reading area 201 is imaged on the light receiver 7. The formed image of the optical reading area 201 is received by photodiodes or the like and converted into electrical signals by the light receiver 7. The electrical signals output from the light receiver 7 is subject to signal processing by the sensor substrate 6 and an optical image of the optical reading area 201 is obtained.

Figure 4:
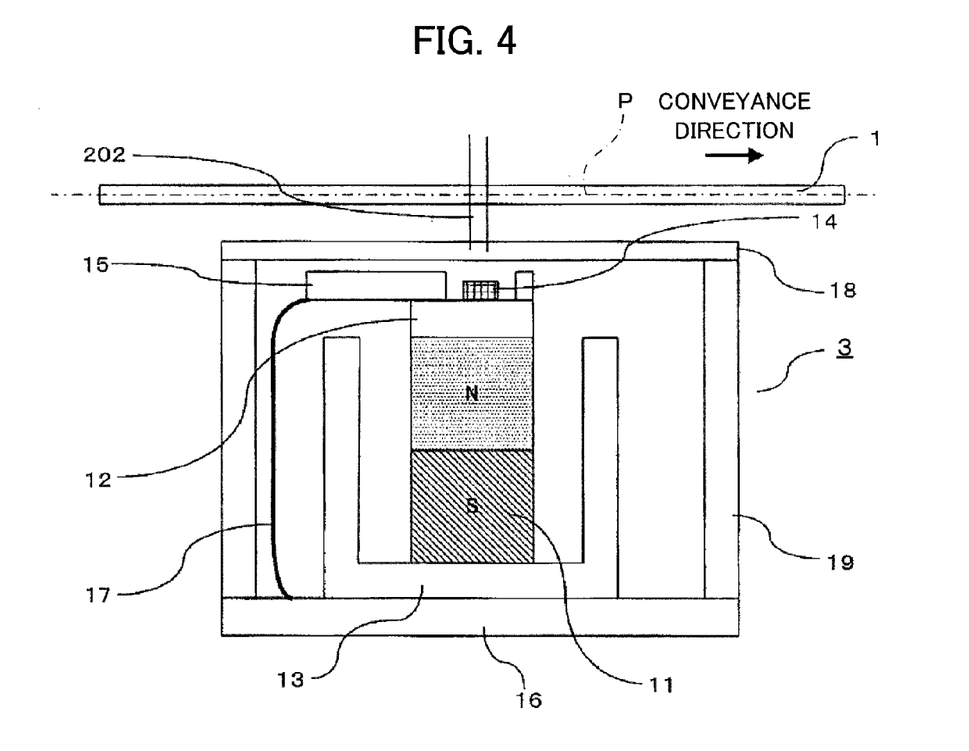
FIG. 4 is a cross sectional view orthogonal to the main scanning direction of a magnetic reader according to Embodiment 1.
Figure 5:
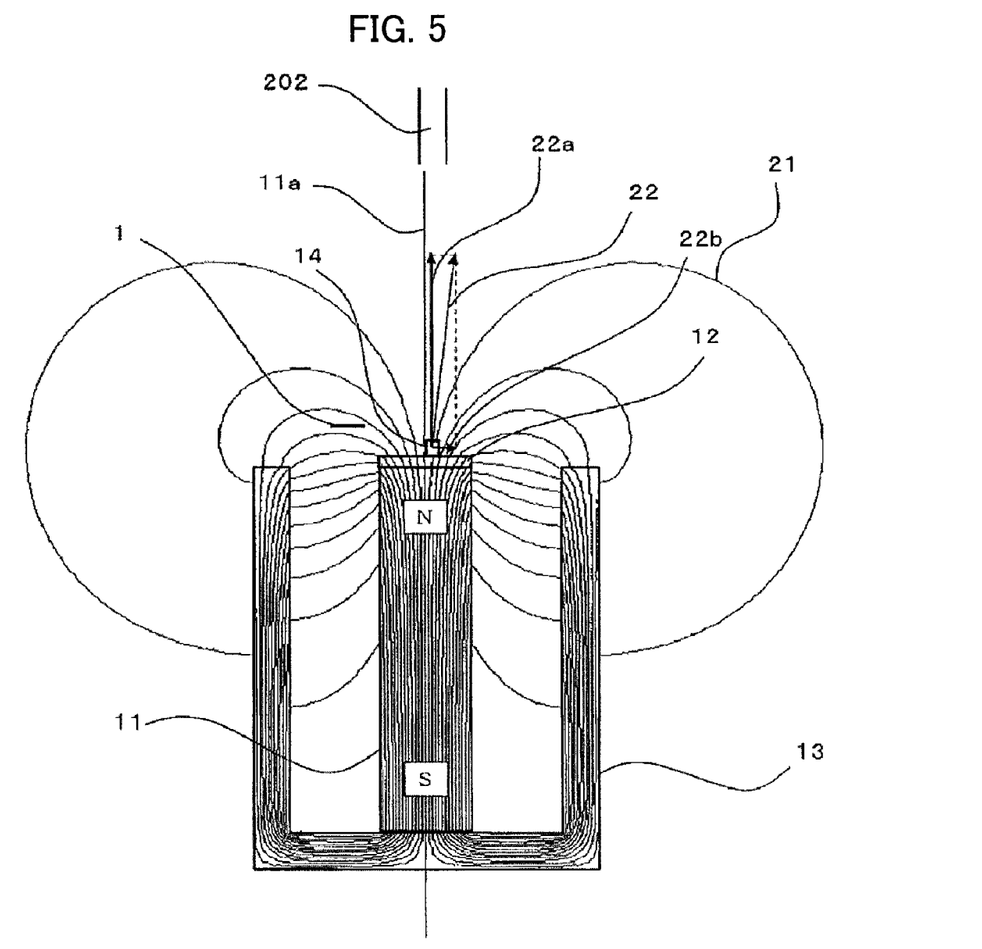
FIG. 5 is a drawing illustrating a distribution of lines of magnetic force caused by a magnetic circuit in FIG. 4.

FIG. 4 is a cross sectional view orthogonal to the main scanning direction of the magnetic reader according to Embodiment 1. FIG. 4 is also an enlarged view of the magnetic reader 3 of FIG. 1. FIG. 5 is a drawing illustrating a distribution of lines of magnetic force caused by a magnetic circuit in FIG. 4.

The lines of magnetic force 21 generated by the magnet 11 exit from the north pole of the magnet 11 to the surrounding space. The lines of magnetic force 21 are concentrated around the end of the north pole of the magnet 11, and the magnetic flux density near the upper surface of the magnet 11 (near the end of the magnet 11 facing toward the conveyance path) increases. The lines of magnetic force 21 exiting from the magnet 11 to the surrounding space enter the side wall portions of the yoke 13, pass through the interior of the yoke 13, and return to the south pole of the magnet 11 to form a closed loop. The use of the yoke 13 shaped in this manner reduces the space through which the lines of magnetic force 21 pass, thus increasing the magnetic flux density.

A magnetic flux vector 22 indicates the direction of the magnetic flux at a location of the MR element 14. A vertical component 22a indicates a component of the magnetic flux vector 22, perpendicular to the conveyance plane P. A conveyance direction component 22b indicates a conveyance direction component of the magnetic flux vector 22.

The lines of magnetic force 21 exiting to the surrounding space are distributed in a manner to extend laterally around the centerline 11a of the magnet 11, as viewed in the cross section orthogonal to the main scanning direction. Hence, as shown with the MR element 14 in FIG. 5, the line of magnetic force at a location shifted slightly in the conveyance direction from the centerline 11a has a vertical component 22a with a high magnetic flux density and also a small conveyance direction component 22b. The operation of the magnetic reader 3 is explained hereinafter.

In FIG. 5, at the location where the MR element 14 is placed, the vertical component 22a with a high magnetic flux density exists, and the small conveyance direction component 22b also exists. This is because the MR element is designed to be placed in a location slightly away from the centerline 11a. Such a placement can provide the MR element 14 with a bias magnetic field in the conveyance direction required for appropriate operation of the MR element 14.

The passage of the medium to be read 1 containing magnetic material through the field in such a state causes changes in the magnetic field distribution. At this time, the direction of the magnetic flux vector 22 applied to the MR element 14 changes slightly. Even slight change in the direction of the magnetic flux vector 22 results in an occurrence of significant change on percentage of the conveyance direction component 22b, thus allowing the change to be detected sufficiently by the MR element 14.

Figure 6A:
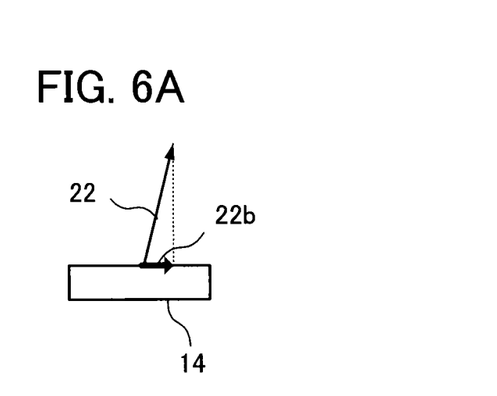
FIG. 6A is a vector diagram of the line of magnetic force at a magnetoresistive effect element according to Embodiment 1.

FIG. 6A is a vector diagram of the line of magnetic force at the magnetoresistive effect element according to Embodiment 1. The vertical component 22a that is a magnetic field crossing the conveyance plane P is a main component of the lines of magnetic force 21 near the location where the MR element 14 is placed. The slight shift of the MR element 14 in the conveyance direction from the centerline 11a causes the magnetic flux vector 22 to tilt in the conveyance direction slightly from the vertical direction, as shown in FIG. 6A. The conveyance direction component 22b of the magnetic field serves as a bias magnetic field of the MR element 14.

Figure 6B:
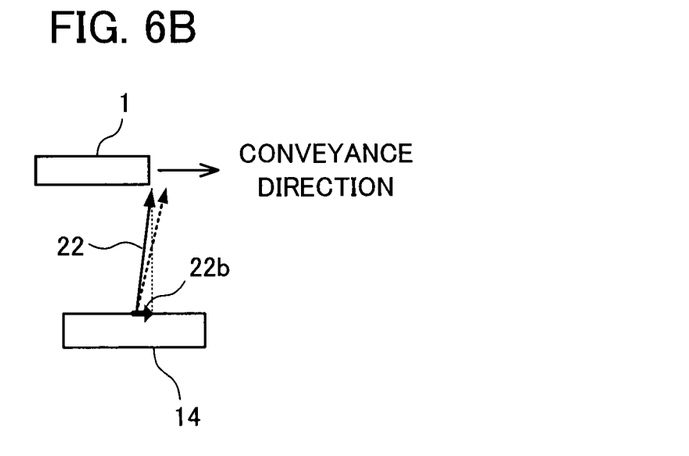
FIG. 6B is a vector diagram of the line of magnetic force when a medium to be read approaches the magnetoresistive effect element.

FIG. 6B is a vector diagram of the line of magnetic force when the medium to be read approaches the magnetoresistive effect element. As the medium to be read 1 containing magnetic material approaches the magnetic reading area 202, as shown in FIG. 6B, the magnetic flux vector 22 tilts toward the medium to be read 1 as if the magnetic flux vector 22 were being physically sucked by the medium to be read 1, which reduces the conveyance direction component 22b in the conveyance direction. In FIG. 6B, the magnetic flux vector 22 in the absence of the medium to be read 1 is indicated with the dotted arrow.

Figure 6C:
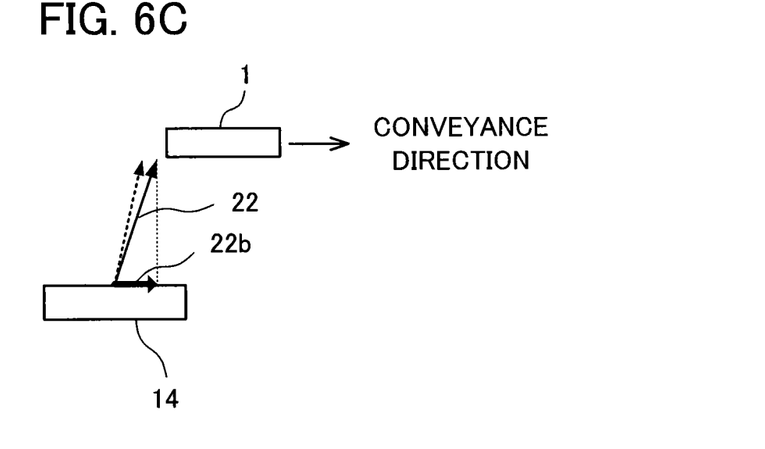
FIG. 6C is a vector diagram of the line of magnetic force when the medium to be read moves away from the magnetoresistive effect element.

FIG. 6C is a vector diagram of the line of magnetic force when the medium to be read moves away from the magnetoresistive effect element. The magnetic flux vector 22 in the absence of the medium to be read 1 is indicated with the dotted arrow, as also shown in FIG. 6C. As the medium to be read 1 containing magnetic material moves away, as shown in FIG. 6C, the magnetic flux vector 22 tilts toward the medium to be read 1 as if the magnetic flux vector 22 were being physically pulled by the medium to be read 1, which increases the conveyance direction component 22b. The movement of the magnetic material of the medium to be read 1 in the conveyance direction changes the resistance value of the MR element 14 that senses the conveyance direction component 22b of the magnetic field. Thus the passage of the medium to be read 1 causes the conveyance direction component 22b in the conveyance direction to change, which in turn changes the resistance value of the MR element 14 that senses magnetically the conveyance component, and enables detecting the magnetic component of the medium to be read 1.

Such a change of the magnetic flux vector 22 results from the passage of the magnetic material of the medium to be read 1. This configuration enables the detection of the passage of the medium to be read 1. As a result, a slight change of the magnetic field caused by the medium to be read 1 can be read.

Figure 7:
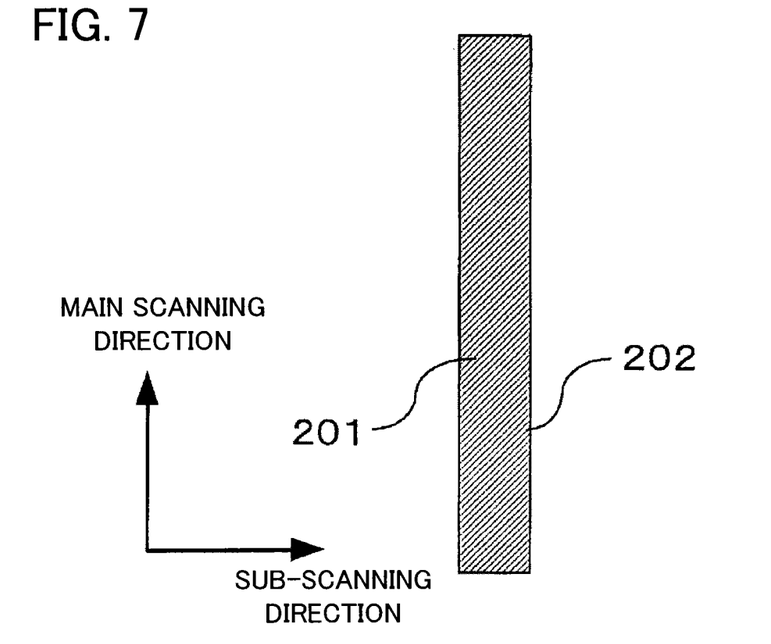
FIG. 7 is a drawing illustrating reading areas of the optical reader and the magnetic reader.

FIG. 7 is a drawing illustrating reading areas of the optical reader and the magnetic reader. The light receiver 7 and the magnetoresistive effect element 14 extend in the main scanning direction and the optical reading area (area to be irradiated) 201 and the magnetic reading area 202 have an elongated shape in the main scanning direction. In FIGS. 1 and 7, the optical reading area (area to be irradiated) 201 of the optical reader 2 is disposed to accord with the magnetic reading area 202 of the magnetic reader 3. Therefore, the light guide 4 irradiates with light the magnetic reading area 202 of the conveyance plane P. Such an overlap of the reading areas enables to obtain the image information and the magnetic information at the same time and location, which in turn enables to read a positional relationship with the optical image and the magnetic pattern as information. As a result, accurate information can be obtained.

Figure 8:
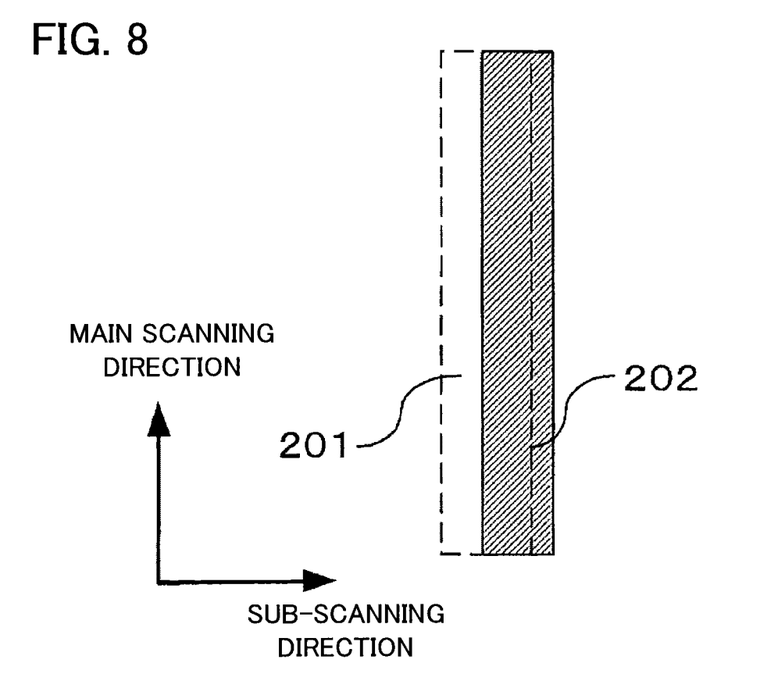
FIG. 8 is a drawing illustrating a variation of the reading areas of the optical reader and the magnetic reader.

FIG. 8 is a drawing illustrating a variation of the reading areas of the optical reader and the magnetic reader. In FIG. 8, the optical reading area (area to be irradiated) 201 of the optical reader 2 and the magnetic reading area 202 of the magnetic reader 3 are accorded with each other in the main scanning direction, but are shifted in the conveyance direction to be overlapped partially. The optical reading area (area to be irradiated) 201 of the optical reader 2 and the magnetic reading area 202 of the magnetic reader 3 are not completely overlapped, but the presence of the overlapped area in the conveyance direction enables to obtain the image information and the magnetic information at the same time and location for the overlapped area. Therefore, error-free and accurate data of the optical image and the magnetic pattern can be obtained, so that determination of conformity of the medium to be read 1 such as paper money and the like is accurately conducted. Furthermore, the similar effect can also be obtained when the optical reading area (area to be irradiated) 201 of the optical reader 2 and the magnetic reading area 202 of the magnetic reader 3 are shifted in the main scanning direction but still overlapped.

Embodiment 1 describes the CIS as an example of the optical reader 2. However, the optical reader 2 of Embodiment 1 is not limited to the CIS. An optical system for forming a reduced image of the optical reading area 201 on a charge-coupled device (CCD) or the like can be used as the optical reader 2.

Embodiment 2

Figure 9:
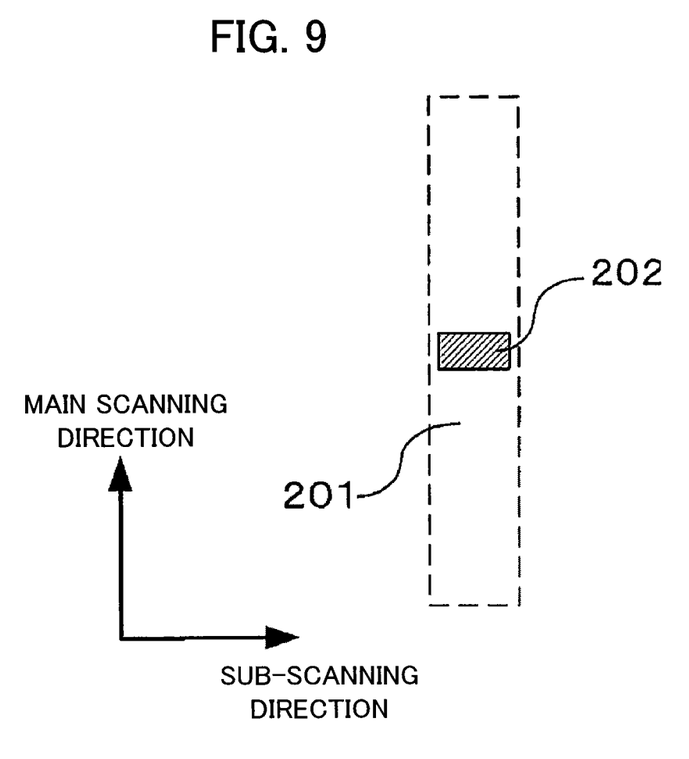
FIG. 9 is a drawing illustrating reading areas of an optical reader and a magnetic reader according to Embodiment 2 of the present disclosure.

FIG. 9 is a drawing illustrating reading areas of an optical reader and a magnetic reader according to Embodiment 2 of the present disclosure. In FIG. 9, the magnetic reading area 202 of the magnetic reader 3 is a portion of the optical reading area 201 along the main scanning direction. If the whole area in the main scanning direction of the medium to be read 1 is not required to be read, for example, when the magnetic information portion of the medium to be read 1 such as paper money or the like is limited, the configuration of FIG. 9 enables the magnetic reading area 202 of the magnetic reader 3 to be limited to the area where the magnetic material is assumed to pass through. Such a limitation of the magnetic reading area 202 enables minimization of the magnetic reader 3 and reduction in the number of parts. Furthermore, the optical reading area 201 of the optical reader 2 and the magnetic reading area 202 of the magnetic reader 3 are overlapped in the sub-scanning direction, so that the effect similar to Embodiment 1 can be obtained.

Embodiment 3

Figure 10:
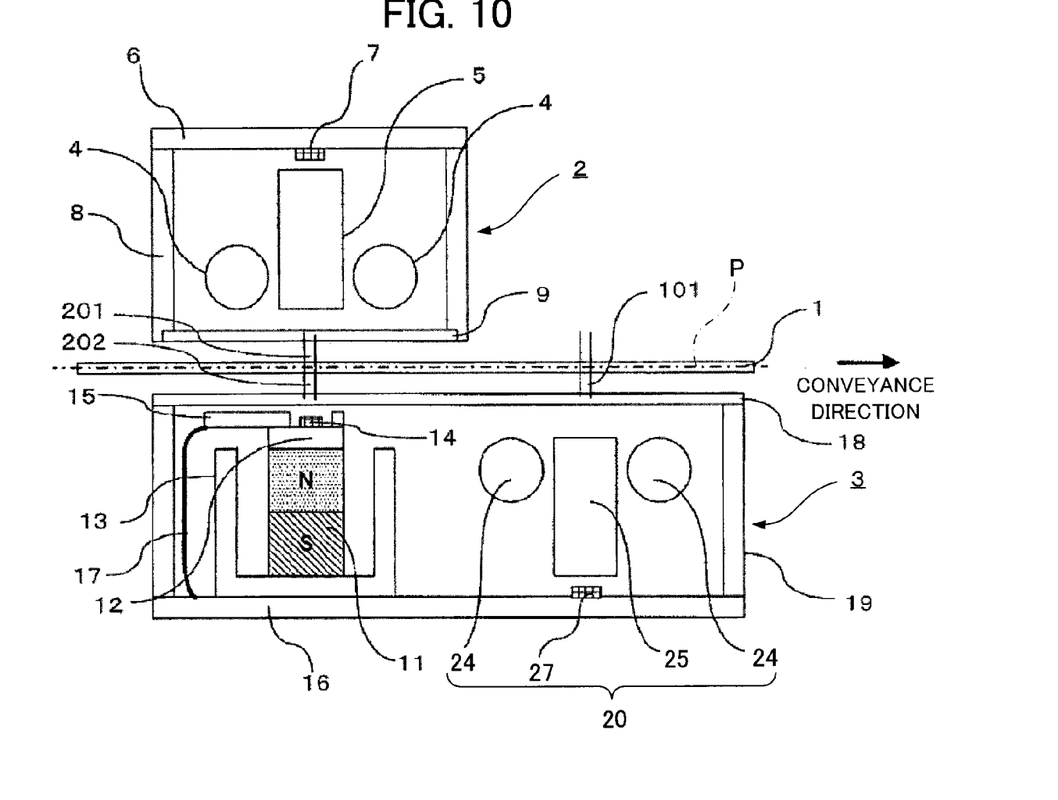
FIG. 10 is a cross sectional view orthogonal to a main scanning direction of an image reading device according to Embodiment 3 of the present disclosure.

FIG. 10 is a cross sectional view orthogonal to a main scanning direction of an image reading device according to Embodiment 3 of the present disclosure. Embodiment 3 includes an optical reader (second optical reader) 20 in a magnetic reader 3. The optical reader 20 is disposed on the magnetic circuit side with respect to the conveyance plane P. The optical reader 20 is configured to have a light guide (second light guide) 24, an imaging optical system (second imaging optical system) 25, and a light receiver (second light receiver) 27. The light guide 24, the imaging optical system 25, and the light receiver 27 are identical to the light guide 4, the imaging optical system 5, and the light receiver 7 of Embodiment 1, respectively. The light receiver 27 is mounted on a signal processing board 16. The imaging optical system 25 forms on the light receiver 27 an image of the optical reading area 101 at the magnetic circuit side with respect to the conveyance plane P. The signal processing board 16 processes the electrical signal output from the light receiver 27, and then obtains an optical image of the optical reading area 101.

Embodiment 3 includes, in addition to the structure of Embodiment 1, the optical reader 20 disposed on the magnetic reader 3 side with respect to the conveyance plane P, so that the image information (101) of the medium to be read 1 at the magnetic reader 3 side can also be obtained. The image reading device of Embodiment 3 can obtain the image information on both sides of the medium to be read 1. This results in further improvement in identification accuracy of the medium to be read 1.

The present disclosure can be embodied in various ways and can undergo various modifications without departing from the broad spirit and range of the disclosure. Moreover, the embodiment described above is for explaining the present disclosure, and does not limit the range of the present disclosure. In other words, the range of the present disclosure is as set forth in the Claims and not the embodiment. Various changes and modifications that are within the range disclosed in the claims or that are within a range that is equivalent to the claims of the disclosure are also included within the range of the present disclosure.

This application claims the benefit of priority based on Japanese Patent Application No. 2013-79745, filed on Apr. 5, 2013, including the specification, claims, and abstract. The entire disclosure of the Japanese Patent Application No. 2013-79745 is incorporated herein by reference.

REFERENCE SIGNS LIST

1 Medium to be read
2 Optical reader
3 Magnetic reader
4 Light guide
5 Imaging optical system
6 Sensor substrate
7 Light receiver
8 Housing
9 Transmission body
11 Magnet
11a Centerline
12 Yoke
13 Yoke
14 MR element
15 Substrate
16 Signal processing board
17 Signal line
18 Top plate
19 Housing
20 Optical reader (second optical reader)
21 Line of magnetic force 22 Magnetic flux vector
22a Vertical component
22b Conveyance direction component
24 Light guide (second light guide)
25 Imaging optical system (second imaging optical system)
27 Light receiver (second light receiver)
101 Optical reading area (second optical reading area)
201 Optical reading area
202 Magnetic reading area
P Conveyance plane

The invention claimed is:

1. An image reading device comprising:
a magnetic circuit disposed on one side of a conveyance plane, configured to convey a sheet-like medium to be read along a direction of a sheet surface of the medium to be read and to generate a magnetic field in a direction perpendicular to the conveyance plane;
a magnetoresistive effect element disposed between the magnetic circuit and the conveyance plane and configured to detect an intensity variation in a conveyance direction component of the magnetic field in a magnetic reading area when the medium to be read is conveyed along the conveyance plane;
a light source disposed on a side opposite to the magnetic circuit side with respect to the conveyance plane and configured to irradiate the magnetic reading area of the conveyance plane with light; and
an imaging optical system and a light receiver disposed on the side opposite to the magnetic circuit side with respect to the conveyance plane,
wherein the imaging optical system forms an image of an optical reading area, which includes at least a portion in the conveyance direction of the magnetic reading area in the conveyance plane, on the light receiver.

2. The image reading device according to claim 1, wherein the magnetic circuit, the magnetoresistive effect element, the imaging optical system, and the light receiver each extend in a main scanning direction that is parallel to the conveyance plane and orthogonal to the conveyance direction, and the magnetic reading area and the optical reading area are overlapped in the main scanning direction.

3. The image reading device according to claim 2, wherein the length in the main scanning direction of the magnetic reading area is shorter than the length in the main scanning direction of the optical reading area.

4. The image reading device according to claim 1, wherein the magnetoresistive effect element is mounted to the conveyance plane side of the magnetic circuit.

5. The image reading device according to claim 1, wherein the magnetic circuit includes different magnetic poles arranged alternately in a direction perpendicular to the conveyance plane and generates a magnetic field perpendicular to the conveyance plane from an end surface, facing the conveyance plane of the magnetic circuit.

6. The image reading device according to claim 1, wherein the magnetic circuit includes a yoke disposed at an end, facing the conveyance plane, of the magnetic circuit.

7. The image reading device according to claim 1, wherein the magnetic circuit includes a yoke having a bottom portion in contact with an end surface at a farthest side from the conveyance plane and extension portions extending from the bottom portion toward the conveyance plane at both sides thereof in the conveyance direction, the yoke being U-shaped in cross section orthogonal to a main scanning direction that is parallel to the conveyance plane and orthogonal to the conveyance direction.

8. The image reading device according to claim 1, comprising:
a second light source disposed on the magnetic circuit side with respect to the conveyance plane and configured to irradiate with light a second optical reading area at the magnetic circuit side with respect to the conveyance plane; and
a second imaging optical system and a second light receiver disposed on the magnetic circuit side with respect to the conveyance plane,
wherein the second imaging optical system forms an image of the second optical reading area on the second light receiver.

9. The image reading device according to claim 2, wherein the magnetic circuit includes a yoke disposed at an end, facing the conveyance plane, of the magnetic circuit.

10. The image reading device according to claim 3, wherein the magnetic circuit includes a yoke disposed at an end, facing the conveyance plane, of the magnetic circuit.

11. The image reading device according to claim 4, wherein the magnetic circuit includes a yoke disposed at an end, facing the conveyance plane, of the magnetic circuit.

12. The image reading device according to claim 5, wherein the magnetic circuit includes a yoke disposed at an end, facing the conveyance plane, of the magnetic circuit.

13. The image reading device according to claim 2, wherein the magnetic circuit includes a yoke having a bottom portion in contact with an end surface at a farthest side from the conveyance plane and extension portions extending from the bottom portion toward the conveyance plane at both sides thereof in the conveyance direction, the yoke being U-shaped in cross section orthogonal to a main scanning direction that is parallel to the conveyance plane and orthogonal to the conveyance direction.

14. The image reading device according to claim 3, wherein the magnetic circuit includes a yoke having a bottom portion in contact with an end surface at a farthest side from the conveyance plane and extension portions extending from the bottom portion toward the conveyance plane at both sides thereof in the conveyance direction, the yoke being U-shaped in cross section orthogonal to a main scanning direction that is parallel to the conveyance plane and orthogonal to the conveyance direction.

15. The image reading device according to claim 4, wherein the magnetic circuit includes a yoke having a bottom portion in contact with an end surface at a farthest side from the conveyance plane and extension portions extending from the bottom portion toward the conveyance plane at both sides thereof in the conveyance direction, the yoke being U-shaped in cross section orthogonal to a main scanning direction that is parallel to the conveyance plane and orthogonal to the conveyance direction.

16. The image reading device according to claim 5, wherein the magnetic circuit includes a yoke having a bottom portion in contact with an end surface at a farthest side from the conveyance plane and extension portions extending from the bottom portion toward the conveyance plane at both sides thereof in the conveyance direction, the yoke being U-shaped in cross section orthogonal to a main scanning direction that is parallel to the conveyance plane and orthogonal to the conveyance direction.

* * * * *